United States Patent
Cloonan et al.

(10) Patent No.: US 9,479,352 B2
(45) Date of Patent: Oct. 25, 2016

(54) METHOD FOR SIMULTANEOUSLY MANAGING HIGH-SPEED DATA AND VIDEO STREAMS IN A SINGLE MAC PROCESSING ENVIRONMENT

(75) Inventors: Thomas J. Cloonan, Lisle, IL (US); Jeff Howe, West Chicago, IL (US); Carol Ansley, Johns Creek, GA (US); Mark Bugajski, Norcross, GA (US); Charles Cheevers, Cork (IE); Ian Wheelock, Cork (IE)

(73) Assignee: ARRIS Enterprises, Inc., Suwanee, GA (US)

( * ) Notice: Subject to any disclaimer, the term of this patent is extended or adjusted under 35 U.S.C. 154(b) by 1028 days.

(21) Appl. No.: 12/492,095

(22) Filed: Jun. 25, 2009

(65) Prior Publication Data

US 2010/0005500 A1    Jan. 7, 2010

Related U.S. Application Data

(60) Provisional application No. 61/075,611, filed on Jun. 25, 2008.

(51) Int. Cl.
*H04L 29/06* (2006.01)
*H04N 21/437* (2011.01)
*H04L 12/28* (2006.01)

(52) U.S. Cl.
CPC ......... *H04L 12/2801* (2013.01); *H04L 63/126* (2013.01); *H04N 21/437* (2013.01); *H04L 69/22* (2013.01)

(58) Field of Classification Search
USPC ....... 370/389, 392; 726/11, 13; 725/110, 111
See application file for complete search history.

(56) References Cited

U.S. PATENT DOCUMENTS

| | | | |
|---|---|---|---|
| 6,894,973 B1 * | 5/2005 | Mishra ......................... | 370/229 |
| 7,069,344 B2 * | 6/2006 | Carolan et al. ................ | 709/250 |
| 7,689,716 B2 * | 3/2010 | Short et al. ................... | 709/246 |
| 8,339,959 B1 * | 12/2012 | Moisand et al. .............. | 370/235 |
| 2004/0199914 A1 * | 10/2004 | Aerrabotu et al. ........... | 718/100 |
| 2006/0182139 A1 * | 8/2006 | Bugajski et al. ............. | 370/464 |

* cited by examiner

*Primary Examiner* — Phirin Sam
*Assistant Examiner* — Tarell Hampton
(74) *Attorney, Agent, or Firm* — Stewart M. Wiener

(57) ABSTRACT

A packet data flow processor applies a first level of Data Over Cable Service Interface Specification (DOCSIS) processing to packet flows that are not from trusted sources, and applies a second level of DOCSIS processing, simpler than the first level, to packet flows from the trusted sources.

16 Claims, 4 Drawing Sheets

METHOD FOR SIMULTANEOUSLY MANAGING HIGH-SPEED DATA AND VIDEO STREAMS IN A SINGLE MAC PROCESSING ENVIRONMENT

PRIORITY CLAIM

This application claims priority under 35 USC 119 to U.S. application No. 61/075,611 filed on Wednesday, Jun. 25, 2008, which is incorporated herein by reference.

TECHNICAL FIELD

The present disclosure relates to data flow management.

BACKGROUND

As the service providers for high-speed data and video services continue to migrate and converge their networks, they are rapidly approaching a time where they may be delivering data to many different types of customer premise equipment (CPE) devices inside subscriber homes. As an example, cable providers may soon have subscribers in a single neighborhood with a wide array of different types of legacy and newly-deployed CPE devices, including DOCSIS 1.x cable modems ("CM")s, DOCSIS 2.0 CMs, DOCSIS 3.0 CMs, legacy MPEG2 set top boxes ("STB")s, legacy MPEG2/MPEG4 STBs, and MPEG2/MPEG4 IP STBs (behind various types of CMs). In addition, service providers are also approaching a time where the sources of their video content may be coming from many different locations, including walled-garden, operator-managed video servers, third-party content providers on the Internet with contractual partnerships with the operator, and third-party content providers on the Internet without contractual partnerships with the operator.

As a result of these various mixes of traffic sources and traffic sinks, the operators would typically require a large array of products to efficiently deliver all of these different high-speed data and video data streams to their subscribers in the future. In addition, another large array of boxes may be required to perform secondary processing functions (ex: trans-rating, trans-coding, encryption, etc.) on these packet streams.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
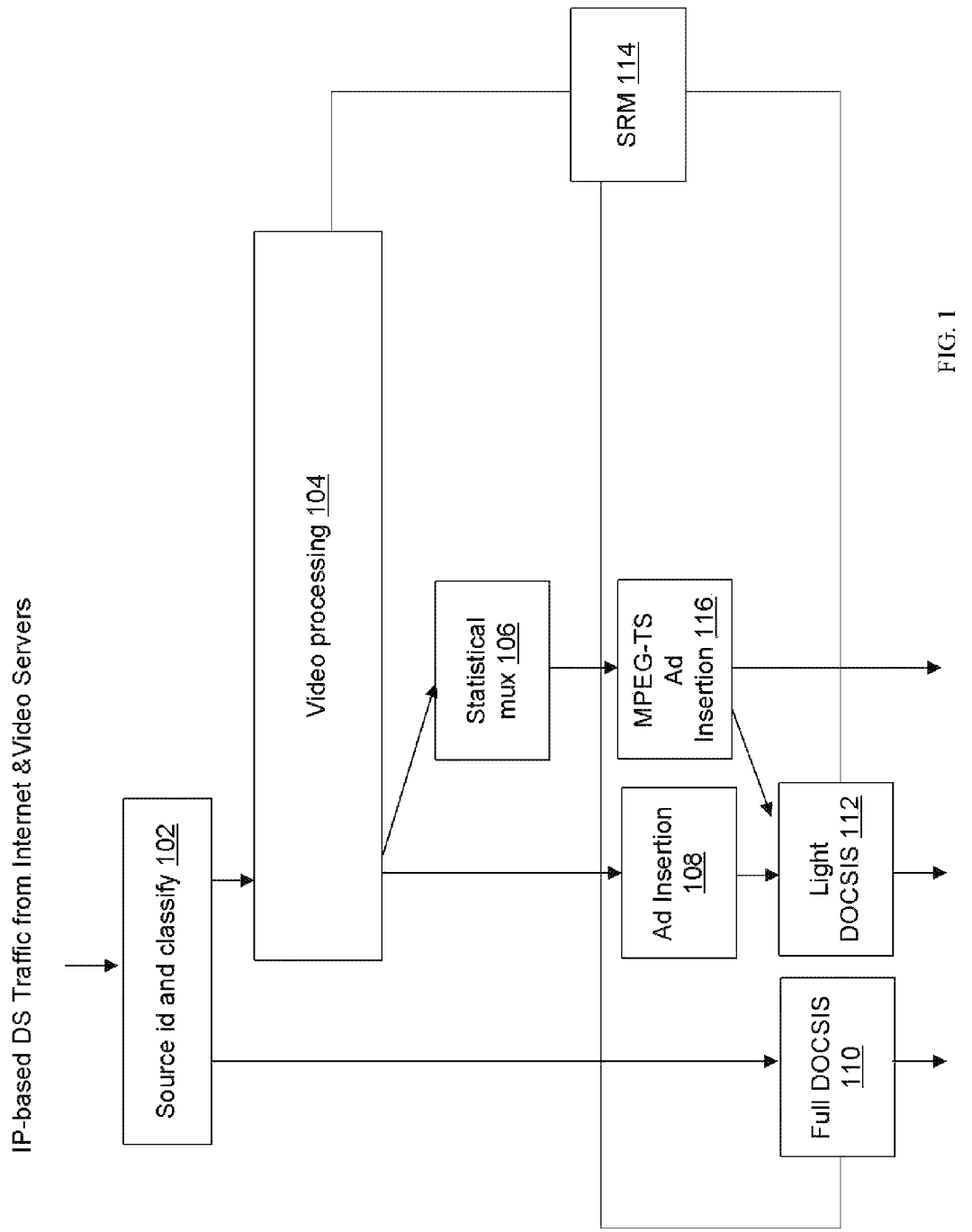
FIG. 1 is a block diagram illustration of an embodiment of a data flow processor in accordance with the principles described herein.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

In the following discussion, references to video data also refer to audio data, and mixtures of audio and video data, unless otherwise indicated.

A unique packet data flow processor in described which applies a first level of Data Over Cable Service Interface Specification (DOCSIS) processing to packet flows that are not from trusted sources, and applies a second level of DOCSIS processing, simpler than the first level, to packet flows from the trusted sources. The packet data flow processor of may apply the second level of DOCSIS processing, simpler than the first level, to packet flows from servers within a same network facility as the packet data flow processor (e.g. commonly owned by the same network operator). The simpler level of DOCSIS processing may also be applied, at least in part, to video packet flows from identified sources external to a same network facility as the packet data flow processor (e.g. trusted or semi-trusted partner sources).

The data flow processor, which may be part of a cable modem termination system (CMTS), may eliminate one or more of classification, policing, shaping, IP filtering, counts, payload header suppression, and BPI for the packet flows from trusted sources. The processor or associated devices may maintain a set of trusted source Internet Protocol (IP) addresses. The data flow processor may determine a load balance among multiple media access control (MAC) data processing units for processing a plurality of packet data flows, where the assignment of a packet data flow to a particular processor is based at least in part on whether the packet data flow is from a trusted source or not. In this manner it may be possible to provide a greater number of downstream media access control (MAC) channel outputs than would be possible without reduced DOCSIS processing of packet data flows from trusted sources. The data flow processor may include a MAC data processor (comprising multiple downstream MAC processors, each possible comprising multiple processing cores), to communicate processing capacity information to a video processing system for one or more packet data flows, and the video processing system may increase features and-or quality of a video packet data flow when the MAC data processor indicates additional capacity to process the one or more packet data flows.

Video data flows may be characterized by longer average packet sizes than other types of high-speed data (such as web page downloads, file transfers, email, and so on). For example, video data flows may comprise packet length that are on average approximately 1300 bytes versus 300 bytes for other types of high-speed data. Video data flows also tend to be longer in duration that other types of high-speed data, lasting for minutes instead of seconds or fractions of a second. Video flows may also have fewer unique source/destination 'quadtupples' than data from a typical web page. For at least these reasons, video flows may be more suitable for processing in a level 1 or level 2 cache than other types of high-speed data flows. Furthermore, under the right circumstances, it may be possible in cable television networks to eliminate some of the standard Data Over Cable Service Interface Specification (DOCSIS) processing that takes place with the communication of high-speed data. For example, certain video flows may be considered 'trusted' or 'semi-trusted', in which case a less processing-intensive form of DOCSIS may be applied to these flows. This feature is elaborated on in greater detail in the description which follows.

Delivery of video over internet protocol (IP), also known as IPTV, is a growing application in cable television networks. As the demand for the IPTV grows among subscribers, the need for ever greater numbers of downstream data delivery channels in the cable network increases. It is therefore desirable to increase the number of downstream data channels available to cable television providers, without proportionally increasing their costs. The costs of implementing a downstream data channel, for example, in a cable modem termination system (CMTS), is proportional to the packet arrival rate that the downstream channel need to support on average and/or on peak. Packet arrival rate, it turns out, is influenced by the average packet size that the system can expect to process.

Typical high-speed IP data in a cable television network may be expected to have packet sizes within the 300-500 bytes per packet range. However, IPTV packets may have significantly larger average packet sizes that on average are closer to the 1500 byte IP protocol limit. Transporting video over IP in cable networks means the flows may be directed to personal computers, personal digital assistants, cell phones, and other devices that support IP but which do not support legacy cable television video protocols. IP is typically transported over cable television networks using the Data Over Cable Service Interface Specification, or DOCSIS. Encapsulating video using IP enables cable operators to eventually migrate towards an end-to-end IP network with associated cost savings in equipments and maintenance over hybrid protocol networks. Various other solutions have been proposed to packetize video streams into IP at the edge of the network (E-QAM) or at the set-top box on the customer premises. These solutions do not offer the promise of an end-to-end IP network.

As previously described, video flows may have certain properties that distinguish them from other high-speed data flows. A data flow processor, such as a Media Access Control (MAC) processor, may exploit these properties to achieve improved cache management and system performance. For example, the allocation of video flows may be balanced among a plurality of MAC processors, each comprising multiple cores and local cache memory (e.g. level 1 and/or level 2 caches). In this manner, the number of cache misses and writebacks may be reduced, thus reducing read and write traffic to external memory across the external memory bus. This may improve system performance and significantly increase the numbers of downstream channels that may be supported with a given number of MAC processors.

IPTV streams may originate from a number of sources. Some of these sources are 'trusted' within the cable television environment, because they are video servers under the control and operation of the cable operators (e.g. walled-garden servers). Other of these sources are 'semi-trusted' because, although outside the control of the cable television operators, they have contractual or other trusted relationships with the cable television operators. Other sources are untrusted being, for example, Internet-based content sources over which the cable television operator has no influence or control.

A less resource-intensive form of DOCSIS processing may be applied to data flows, and television data flows in particular, which originate from trusted or semi-trusted sources. This makes it possible to increase the number of downstream channels in a data flow processor for a given cost.

FIG. 1 is a block diagram illustration of an embodiment of a data flow processor in accordance with the principles described herein. Streams (data flows) from various sources are sourced and/or classified at 102. Video streams from trusted sources are routed to video processing 104 for format conversion and other video processing; see the description which follows for details. Output of the video processing 104 may be provided to a statistical multiplexer 106 (e.g. channel bonding) and ad insertion 116, or directly for ad insertion 108. The trusted video streams may be provided with light DOCSIS processing 112. Non-video stream, or video streams from untrusted sources, may be routed for standard DOCSIS processing 110. A Session Resource Manager (SRM) 114 coordinates resource allocation between the video processing system 104 and DOCSIS processing (110, 112). In some embodiments, the SRM 114 may not be involved in coordinating resource allocation.

Traditional MPEG Transport Stream (TS) ad insertion may be carried out by 116, and whatever is needed to insert ads into other IPTV codecs, for example FLASH or Sliverlight, may be performed by 108.

This position in the network is potentially even more addressable and closer to the 'edge' than current ad insertion solutions. Ad insertion at this point may be completely addressable to individual client devices. Current ad insertion boxes are at a similar location or level in the network, but up to this point have not addressed high stream count architectures as would be needed to address specific ads within each outgoing stream. In conventional approaches, a single stream is typically targeted toward a narrowcast service group, which is much larger than the addressability provided by the CER.

A Cable Modem Termination System (CMTS) may be configured with a number of MAC processors for downstream channels. The MAC processors may each comprise multiple cores, e.g. sub-processors capable of independent action to a certain extent. The CMTS may be configured with a significantly greater number of RF (Radio Frequency)

QAM channel outputs than conventional data flow processors that don't account for the unique properties of IPTV flows.

Data flows may be allocated among the MAC processors in a manner that makes efficient use of cache allocation. For example, non-IPTV data flows may be assigned to MAC processors with higher available cache resources, because such flows tend to involve more misses and write-backs in constrained caches. Multiple IPTV flows, especially from trusted or semi-trusted sources, may be allocated to a single MAC processor in order to exploit cache efficiencies and lighter (less resource intensive) versions of DOCSIS processing.

A flow control processor may maintain a table (or other form of data organization) comprising IP addresses (or other indications of source) and an associated characteristic (trusted, semi-trusted, untrusted, for example). Data streams are examined for their source IP address (or other indication of source). Streams may be further profiled to determine if they are IPTV streams. IPTV streams from trusted and possibly from semi-trusted sources are assigned lighter DOCSIS processing, and further may be assigned among the MAC processors for more optimal cache resource allocation.

Figure 2:
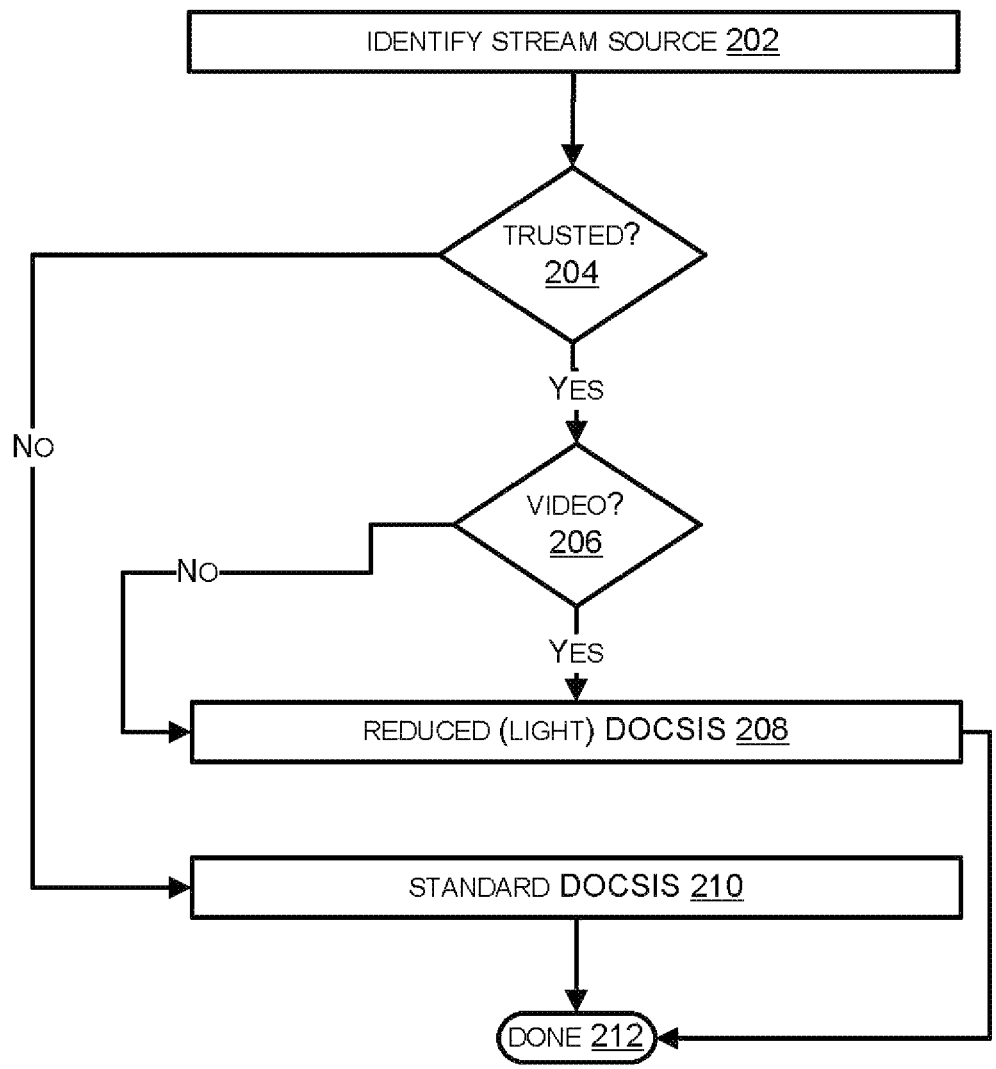
FIG. 2 is a flow chart of an embodiment of a process of assigning data flows to light or standard processing.

FIG. 2 is a flow chart of an embodiment of a process of assigning data flows to light or standard processing. The stream source is identified (202) and if it is a trusted source (204), and video (206) light processing is performed (208). Otherwise, standard processing is performed (210). At (212) the process concludes.

Figure 3:
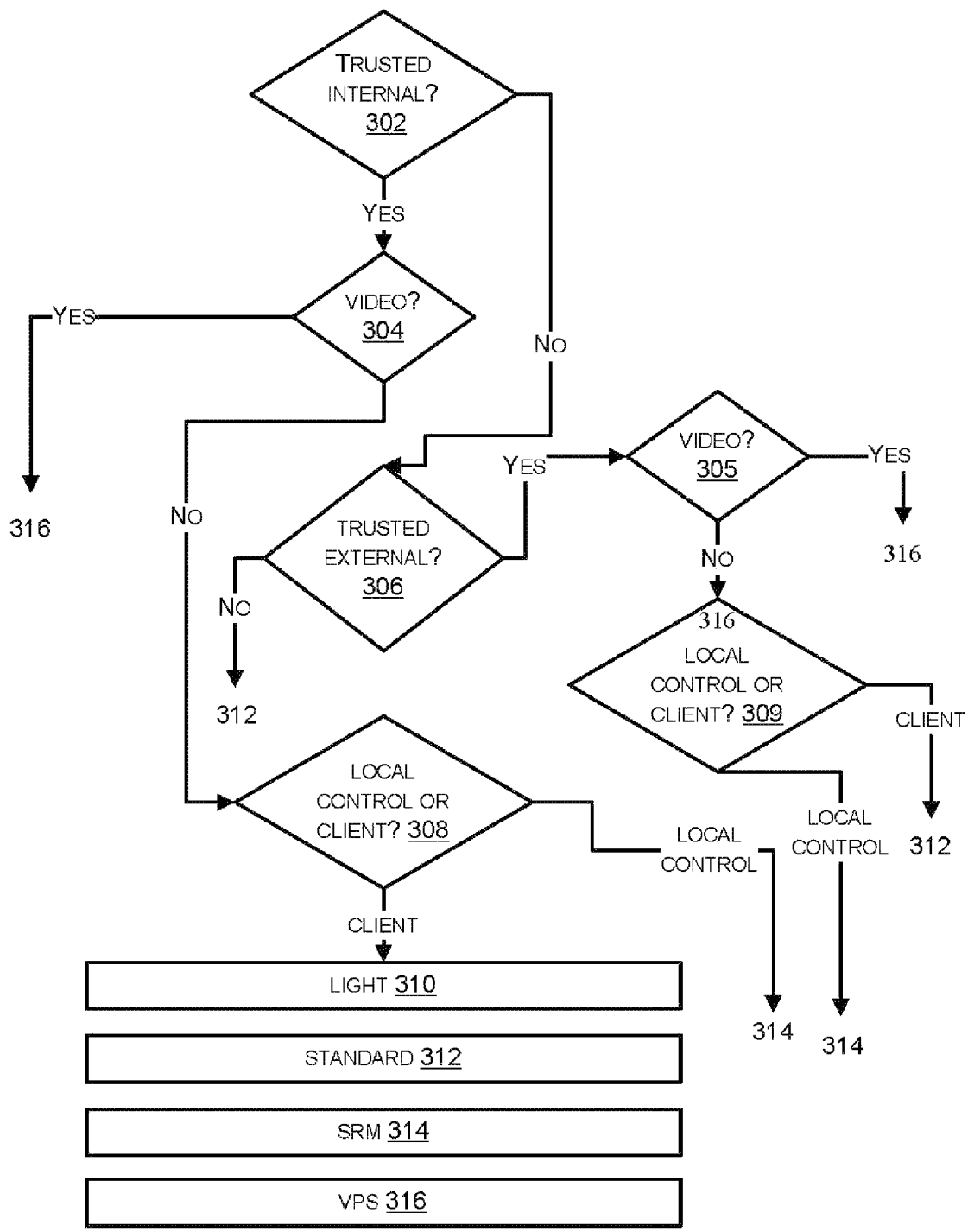
FIG. 3 is a more detailed flow chart of an embodiment of system for routing data packets.

FIG. 3 is a more detailed flow chart of an embodiment of system for routing data packets. If the source of the packets is a trusted 'internal' source (302) (e.g. a walled-garden video server), and if the packets are video (304), the packets are routed to a video processing system (VPS) (316). Video packets from trusted external sources are routed for full DOCSIS processing in some cases, or light DOCSIS processing in others, depending on the implementation—see 305. The VPS 316 performs various video processing functions, such as format conversion (see details below), and routes the packets for either light (310) or standard (312) processing. If the source is trusted but 'external' (306) (e.g. not owned by the network provider but in association with them), and if the packets are video (305), the packets are routed to the VPS (316). Local control packets from trusted internal and external sources are routed to the Session Resource Manager (SRM) (314)—see 308, 309. Possible functions of the SRM (314) are described in more detail below. Non-video packets from trusted internal sources may routed for light DOCSIS processing—see 308, 310. All other packets are routed for standard DOCSIS processing.

Typical DOCSIS data flow processing by a MAC processor may involve classification, policing, shaping, scheduling, IP filtering, counts, payload header suppression, BPI+ encryption, channel bonding, MAC header prepending, MPEG encapsulation (if CMTS or M-CMTS DEPI MPT is used), and DEPI encapsulation (if M-CMTS DEPI is used), among other things. Many of the more-challenging, processing-intensive of these functions may be eliminated if it is determined that the traffic is IPTV and/or comes from a trusted or semi-trusted source. Some processing that may be potentially eliminated or at least simplified for such streams includes classification, policing, shaping, IP filtering, counts, payload header suppression, BPI+ encryption, and channel bonding.

Metadata may be associated with a particular data flow source (e.g. a digital video file), family of streams (e.g. video files from a particular publisher or source), IP address, or other source indication. The meta-data identifies which DOCSIS functions may be eliminated or reduced for the associated streams. The cable television operator (or other network operator, e.g. a telephone system operator) may provide this data with a stream, or via another source, or may provide control data to the data flow processor, indicating which data flow functions are to eliminated or simplified for particular streams, or in general.

Classification identifies which packets are associated with a particular customer and also identifies the Quality of Service levels that the customer has signed up for (which is in turn used to limit the amount of bandwidth a user gets or to determine if a user's packets are eligible for dropping during congestion). For example, if all of the IPTV traffic coming from a service is trusted and flowing to the data flow processor because an IPTV Session Manager has initiated the flow of IPTV packets, there may not be a need to classify the packets. The IPTV Session Manager may have already checked that there is adequate bandwidth available to support these IPTV packets.

Policing as used herein means determining the amount of bandwidth that a particular customer is using as a function of time. Policing may involve dropping packets if the user's bandwidth usage exceeds certain thresholds. If the IPTV traffic is well-managed and coming from a source that controls and measures the rate at which the IPTV packets are sent, then this policing function could be eliminated.

Shaping is an advanced Quality of Service function that essentially delays packets to match a user's bandwidth usage to a pre-specified bandwidth profile. If the IPTV traffic is well-managed and coming from a source that controls and measures the rate at which the IPTV packets are sent, then this shaping function could be eliminated.

IP Filtering is a mechanism for controlling which packets can be sent to a particular user. It provides a "firewall" type function. If the IPTV traffic is well-managed and coming from a source that is an approved source, IP filtering could be eliminated.

Counts is a mechanism for keeping statistics on the number of packets transmitted to a particular customer. If the IPTV traffic is well-managed and coming from a source that keeps statistics itself, counts function could, be eliminated.

Payload header suppression is a mechanism for increasing the channel efficiency by removing certain repetitive byte sequences from a packet header at the CMTS for transmission over the DOCSIS channel, and then re-inserting the repetitive byte sequences at the destination, e.g. cable modem. It is typically used for short packets, where the benefits are amplified. Because IPTV packets tend to be long packets, the benefits of payload header suppression are lower, and it could therefore be eliminated.

BPI+ is a mechanism for encrypting the packets being sent to a particular customer. If the IPTV streams are pre-encrypted at the stream source (to ensure that they are not routed in the open throughout the home), then these encryption functions could be eliminated for IPTV.

Channel bonding is the creation of a larger-bandwidth aggregate channel by logically combining multiple lower-bandwidth channels. This can lead to statistical multiplexing gains when variable bit rate IPTV traffic is transmitted over the larger channels. Channel bonding has certain benefits that it may be desirable to retain for IPTV traffic, although in some circumstances this function could be eliminated.

IP/Ethernet packets that arrive at a CMTS must have their Ethernet header extended with additional bit-fields so that they can be properly pass the DOCSIS tunnel between the CMTS and the cable modem. Extending the Ethernet header to accommodate the DOCSIS header is what is typically referred to as MAC header pre-pending, because it effectively prepends and additional header in front of the normal Ethernet header.

DEPI stands for Downstream External PHY Interface. DEPI defines a Layer 2 Tunneling Protocol, Version 3 (L2TPv3) tunnel that can be used to transmit DOCSIS packets from a CMTS MAC core to an external edge QAM (EQAM), where the final digital-to-analog conversion is implemented on the passing DOCSIS packets.

MPT is one of two forms of passing DOCSIS packets through the DEPI tunnel. It stands for MPEG Transport Stream mode. The other form of passing DOCSIS packets through a DEPI tunnel is the PSP mode, which stands for the Packet Streaming Protocol mode.

A novel data flow processor has been described herein as implemented by a CMTS. In other embodiments, a data flow processor in accordance with these principles is implemented via a Converged Edge Router (CER), which may be implemented within or included in a CMTS or separately from it. The CER is connected to a converged IP network that connects in turn to one or more Internet Service Provider (ISP) connections to provide Internet connectivity, and that connects to video content delivery systems, such as video servers. The ISP connection(s) are for the most part a source of non-video IP data traffic, but may also provide IP-encapsulated video traffic.

As each packet enters the CER, it is evaluated to determine the most efficient and appropriate classification and routing. If the packet has been sourced by an internal video server (e.g. a trusted source) and can be classified as video traffic, it is directed to lower-overhead DOCSIS processing. Video packets may also be directed to a video processing system for format conversion and other video processing functions. If the packet is from a trusted source and is addressed to the Session Resource Manager (SRM), or Edge Resource Manager (ERM), it is directed to the appropriate one of those functional units. If a packet is classified as a data packet from an untrusted source, it is directed to the DOCSIS MAC for full standard DOCSIS processing.

The SRM is a computing system that manages a variety of types of switched digital video sessions, standard switched digital video as well as Video on Demand. The ERM is a system that manages and tracks the usage of edge resource elements, such as Edge QAMs. The SRM and ERM work together. For example, a client requests a channel change to watch a new program. The SRM receives the request and determines first if that content is available. The SRM then queries the ERM for transmission resources to pass the content to the client. Once the ERM has identified the available resources, the SRM selects one and reserves it with the ERM. Then the SRM notifies the appropriate video source to begin streaming content to the edge transmission resource.

The SRM may have an expanded role where it also negotiates with the VPS for processing resources if the available content stream is mismatched in some way with the stream requested by the end client. The SRM may further mediate between the VPS and the MAC processors. For example, if MAC resources are less than fully utilized, the MAC processor may communicate (e.g. via the SRM) to the VPS to indicate that the VPS may perform video processing to increase quality, frame rate, or provide other enhanced services that exploit the available MAC resources. Likewise, if the MAC processor is over-utilized, it may communicate with the VPS to scale back video stream features. The VPS may communicate to the MAC that a stream from a certain source is to be processed, and the MAC may determine the resources needed to process video from the identified source, and communicate with the VPS to determine the appropriate video quality or other features. For example, the VPS may communicate to the MAC processor that a video stream from a certain source is to be communicated downstream. The MAC may identify the source as a trusted one, so that lower DOCSIS resource commitments are required by the MAC to process the stream. The MAC may then indicate to the VPS that a higher frame rate, quality, or enhanced features are possible for the stream, due to the increased resources available to the MAC for processing the stream from the trusted source.

Figure 4:
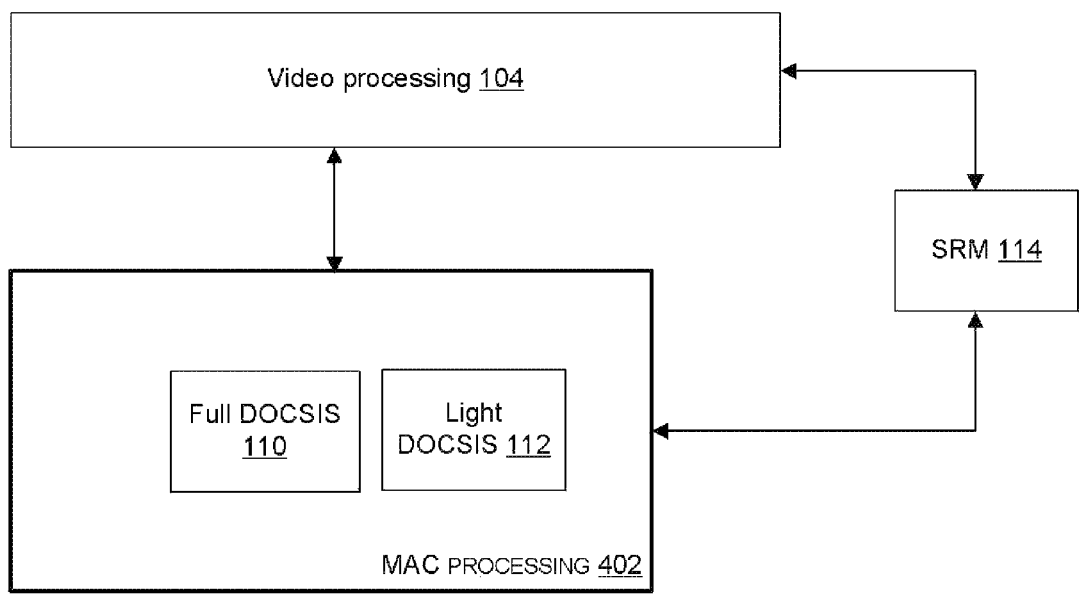
FIG. 4 is an embodiment of a system in which a Session Resource Manager (SRM) mediates resource allocation between a video processor and the MAC processor.

FIG. 4 is an embodiment of a system in which a Session Resource Manager (SRM) 114 mediates resource allocation between a video processor 104 and the MAC processor 302. In some embodiments, the MAC processor 302 and video processor 104 may communicate directly for resource allocation.

The system operator may have arrangements with one or more third parties to provide enhanced services. For example, an Internet video provider may contract with the system operator to provide enhanced throughput for subscribers that access its videos. The CER may route packets from these partially (semi) trusted sources for full DOCSIS processing, or they may receive the lower-overhead DOCSIS processing, or something in between the two. Video flows may be subjected to video processing by the VPS. This arrangement may benefit the system operator because it involves fewer separate head-end components, more coordination between components than in previous installations, and a level of trust in the characteristics of the traffic from these sources will allow scarce processing resources to be directed toward processing other traffic.

The Video Processing Subsystem (VPS) may incorporate video processing subsystems, such as multiple digital signal processing (DSP) engines with hardware and software adaptations to perform video processing efficiently. IPTV streams from trusted and semi-trusted sources may be directed to the VPS. Some examples of desirable video processing features include, but are not limited to:

The ability to change the average and peak bit rates of a video program

The ability to convert a video program from one codec, such as MPEG-2, to another, such as MPEG-4

The ability to convert a video stream from one resolution to another, such as from HD to SD The ability to insert Emergency Alert in response to notification The ability to overlay other video images, such as a non-emergency weather alert, over existing program content The ability to insert alternate video clips into video program streams, such as inserting local advertisements in the appropriate program segments The VPS can also incorporate other desirable higher-level video processing features such as program assembly, and single or multiple program transport stream generation. An example of this functionality is the addition of a secondary language channel to a program stream. Another example would be the demultiplexing and re-multiplexing operations required when program streams from several MPEG-2 Multiple Program Transport Streams (MPTS) are received and re-multiplexed into a single MPT. The VPS may also provide protocol conversion between different IP delivery protocols, such as a conversion from multicast video streaming to unicast video streaming. A preferred embodiment for these features would be a series of high performance network processors. Even though this discussion centers primarily on the video aspect of program alteration, it should be noted that parallel audio activities may also be performed by the VPS for all of these features.

Finally, the VPS can also incorporate other video support infrastructure such as video storage and retrieval. An example of the motivation to include this functionality is the need to have storage of advertising segments for easy access to the ad insertion engines.

As each packet enters the VPS, it may be classified to a particular stream and will receive the processing treatment that has been set up for that stream. The computing infrastructure necessary to receive and manage those assignments is a part of the Resource Management Subsystem (RMS). The RMS ideally receives and processes requests and assignments from a variety of sources including:

Video on demand clients and management systems
Switched digital video clients and management systems
Ad insertion management systems
IPTV clients/users and management systems Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:
1. A packet data flow processor comprising:
   logic to apply a first level of Data Over Cable Service Interface Specification (DOCSIS) processing to packet flows that are not from trusted sources;
   logic to apply a second level of DOCSIS processing, the logic to apply the second level of DOCSIS processing being operable to eliminate one or more of classifica- tion, policing, shaping, IP filtering, counts, payload header suppression, and BPI for the packet flows from trusted sources; and wherein the logic to apply a second level of DOCSIS processing to packet flows from the trusted sources further comprises: logic to apply the second level of DOCSIS processing to video packet flows from servers within a same network facility as the packet data flow processor.

2. The packet data flow processor of claim 1, wherein the logic to apply a second level of DOCSIS processing to packet flows from the trusted sources further comprises:

logic to apply the second level of DOCSIS processing to video packet flows from identified sources external to the network facility for the packet data flow processor.

3. The packet data flow processor of claim 1, further comprising:

logic to maintain a set of trusted source Internet Protocol (IP) addresses.

4. The packet data flow processor of claim 1, further comprising:

logic to determine a load balance among multiple media access control (MAC) data processing units for processing a plurality of packet data flows, where the assignment of a packet data flow to a particular processor is based at least in part on whether the packet data flow is from a trusted source or not.

5. The packet data flow processor of claim 1, further comprising:

logic to provide a greater number of downstream media access control (MAC) channel outputs than would be possible without reduced DOCSIS processing of packet data flows from trusted sources.

6. The packet data flow processor of claim 1, further comprising:

logic to enable a MAC data processor to communicate processing capacity information to a video processing system for one or more packet data flows; and logic for the video processing system to increase one or more of: features of a video packet data flow and quality of the video packet data flow, when the MAC data processor indicates additional capacity to process the one or more packet data flows.

7. A packet data flow processing method, comprising:

in a packet data flow processor, determining if a packet data flow is from a trusted source;

activating logic, in the packet data flow processor, for causing a first level of Data Over Cable Service Interface Specification (DOCSIS) processing to be performed on the packet data flow if it is not from a trusted source; and activating logic, in the packet data flow processor, for causing a second level of DOCSIS processing to be performed on the packet data flow, the second level of DOCSIS processing being operable to eliminate one or more of: classification, policing, shaping, IP filtering, counts, payload header suppression, and BPI for the packet flows from trusted sources;

wherein causing the second level of DOCSIS processing to be performed on packet flows from the trusted sources further comprises: causing the second level of DOCSIS processing to be applied to video packet flows from servers within a same network facility as the packet data flow processor.

8. The packet data flow processing method of claim 7, further comprising:

causing the second level of DOCSIS processing to be performed for video packet flows identified to be from servers identified as belonging to a set of trusted sources.

9. The packet data flow processing method of claim 7, further comprising:

maintaining a set of trusted source Internet Protocol (IP) addresses.

10. The packet data flow processing method of claim 7, further comprising:

balancing packet data processing load among multiple media access control (MAC) data processing units; and assigning a packet data flow to a particular MAC processor based at least in part on whether the packet data flow is from a trusted source or not.

11. The packet data flow processing method of claim 7, further comprising:

provisioning a MAC data flow processor with a greater number of downstream media access control (MAC) channel outputs than would be possible without reduced DOCSIS processing of packet data flows from trusted sources.

12. The packet data flow processing method of claim 7, further comprising:

in a MAC data processor, communicating processing capacity information to a video processing system for one or more packet data flows; and the video processing system increasing one or more of: features of a video packet data flow and quality of the video packet data flow, when the MAC data processor indicates additional capacity to process the one or more packet data flows.

13. A cable modem termination system (CMTS), comprising:

logic to apply a first level of Data Over Cable Service Interface Specification (DOCSIS) processing to packet flows that are not from trusted sources; and logic to apply a second level of DOCSIS processing, the logic to apply a second level of DOCSIS processing being operable to eliminate a processing stage for packets originating from trusted sources thereby reducing complexity of packet processing for packet flows from trusted sources, the eliminated processing stage comprising one or more of: classification, policing, shaping, IP filtering, counts, payload header suppression, and BPI; and wherein the logic to apply a second level of DOCSIS processing to packets originating from trusted sources further comprises logic to apply the second level of DOCSIS processing to video packet flows from servers within a same network facility as the CMTS.

14. The CMTS of claim 13, wherein the logic to apply a second level of DOCSIS processing to packet flows from the trusted sources further comprises:

logic to apply the second level of DOCSIS processing to video packet flows from identified sources external to the network facility for the CMTS.

15. The CMTS of claim 13, further comprising:
logic to maintain a set of trusted source Internet Protocol (IP) addresses.

16. The CMTS of claim 13, further comprising:
logic to determine a load balance among multiple media access control (MAC) data processing units for processing a plurality of packet data flows, where the assignment of a packet data flow to a particular processor is based at least in part on whether the packet data flow is from a trusted source or not.

* * * * *